United States Patent
Guy

(10) Patent No.: US 6,260,614 B1
(45) Date of Patent: Jul. 17, 2001

(54) FIBER OPTIC BUNDLE INTERSTITIAL COOLING USING HEAT PIPE TECHNOLOGY

(75) Inventor: James K. Guy, Mesa, AZ (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/550,137

(22) Filed: Apr. 17, 2000

(51) Int. Cl.[7] ................................................. F28F 7/00
(52) U.S. Cl. ........................... 165/185; 385/115; 174/252
(58) Field of Search ................................. 165/185, 80.3, 165/104.26, 104.33; 361/704, 709; 174/16.3, 68.1, 252; 385/93, 115, 136, 94; 257/712

(56) References Cited

U.S. PATENT DOCUMENTS

| | | | |
|---|---|---|---|
| 4,622,054 | * | 11/1986 | Huey et al. ................................. 65/2 |
| 4,636,234 | * | 1/1987 | Huey et al. ................................. 65/2 |
| 4,854,667 | | 8/1989 | Ebata et al. . |
| 4,890,289 | * | 12/1989 | Basu et al. ............................. 372/33 |
| 5,077,637 | * | 12/1991 | Martorana et al. ................... 165/185 |
| 5,117,472 | * | 5/1992 | Blyler, Jr. et al. ....................... 385/28 |
| 5,157,753 | * | 10/1992 | Rogers, Jr. ............................. 385/115 |
| 5,316,080 | * | 5/1994 | Banks et al. ........................... 165/185 |
| 5,436,997 | * | 7/1995 | Makiuchi et al. ....................... 385/94 |
| 5,825,624 | * | 10/1998 | Arnold et al. ......................... 165/185 |
| 5,827,267 | | 10/1998 | Savage et al. . |
| 5,874,775 | * | 2/1999 | Shiomi et al. ......................... 257/712 |
| 6,078,714 | * | 6/2000 | Cavanaugh ............................ 385/115 |
| 6,113,285 | * | 9/2000 | Ward ...................................... 385/93 |
| 6,187,030 | * | 2/2001 | Gart et al. ............................... 607/93 |

* cited by examiner

Primary Examiner—Ira S. Lazarus
Assistant Examiner—Terrell McKinnon
(74) Attorney, Agent, or Firm—Harness Dickey & Pierce P.L.C.

(57) ABSTRACT

A fiber optic bundle incorporating heat pipes in the form of elongated, thermally conductive elements disposed in interstitial spaces formed between adjacent fiber optic strands of the bundle for cooling the bundle. An end portion of each thermally conductive element extends outwardly from at least one end of the bundle and is coupled to a heat sink. The thermally conductive elements are in thermal contact with the fiber optic strands and operate to channel heat generated in each of the fiber optic strands out from the bundle to the heat sink. The apparatus and method accomplishes effective cooling of the fiber optic bundle without the cost and complexity of systems which attempt to more efficiently couple light to the fiber optic bundle or which conduct fluid through a portion of the bundle.

21 Claims, 1 Drawing Sheet

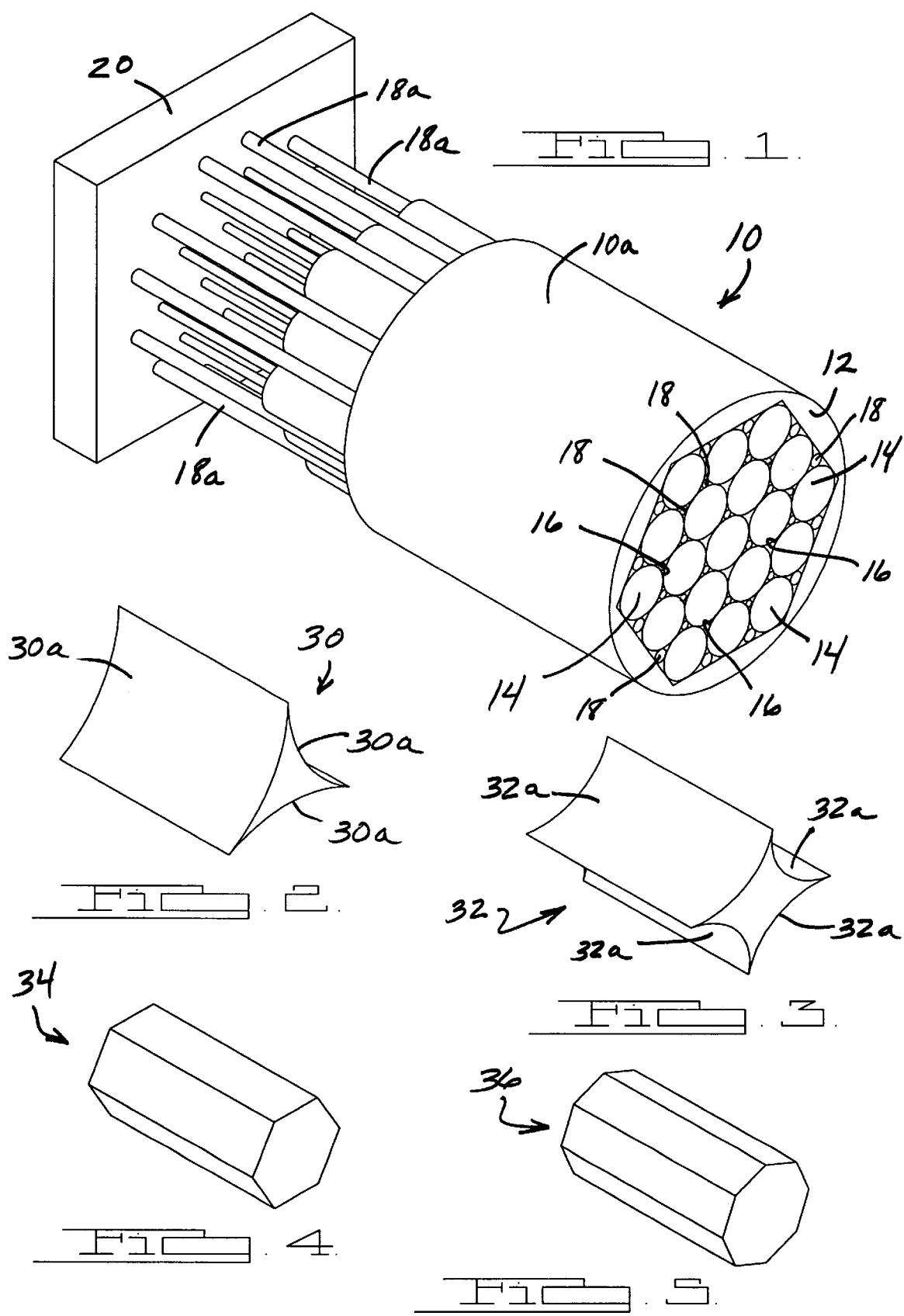

FIBER OPTIC BUNDLE INTERSTITIAL COOLING USING HEAT PIPE TECHNOLOGY

TECHNICAL FIELD

This invention relates to fiber optics, and more particularly to a fiber optic bundle having a plurality of heat pipes disposed in the interstitial spaces between the fiber optic strands of the bundle for cooling the fiber optic strands.

BACKGROUND OF THE INVENTION

There have been many attempts made at trying to cool a fiber optic bundle exposed to high intensity light sources. The root cause of the heating problem lies in the inefficiency in coupling all of the light energy imparted onto the bundle face into the actual fiber optic strands. A portion of the light is captured in the interstitial zones between adjacently disposed pluralities of fibers. The interstitial zones are created when fiber optic strands having circular cross sections are disposed closely adjacent one another.

The light that enters each interstitial zone within the fiber optic bundle has been determined to be about 9.31% [1-(π/(4cos30))] of the light falling on the bundle face. This light becomes absorbed in the cladding of each of the fiber optic strands.

The light falling on the cladding face of the fiber face of each optical fiber strand also does not enter the optical fiber, and therefore also manifests itself as heat. The percentage of loss here is a function of the core/cladding ratio, which varies from manufacturer to manufacturer of the fiber optic strands, and with the diameter of the fiber optic strands. Yet another form of heat generated is light that does enter the fiber face yet is poorly coupled due to a numerical aperture (NA) mismatch from the source to the core medium.

Extensive testing has been performed to better determine exactly where the greatest degree of heat buildup is within the interior of a fiber optic bundle. From this testing it has been determined that the "hot spot" in the bundle is not at the surface as originally believed. The "hot spot" instead manifests itself at a distance from the bundle face according to the three sources of heat described above.

Various attempts have been made to reduce the heat generated within a fiber optic bundle which can cause failure. One attempt has involved trying to reduce the inefficiencies of coupling a light source to a fiber optic bundle by accurate optical methods. Other attempts have involved actually flowing a cooling fluid through a portion of the fiber optic bundle. While possibly providing some degree of heat reduction, these approaches still do not provide the necessary degree of cooling of a fiber optic bundle such that the risk of failure from overheating can be significantly reduced when high intensity light sources are used.

In view of the foregoing, it is a principal object of the present invention to provide a fiber optic bundle construction which much more effectively dissipates the heat developed in the interior areas of the bundle.

It is another object of the present invention to provide a fiber optic bundle construction which makes use of a plurality of heat conductors disposed in the interstitial spaces of the bundle, and wherein the heat conductors are used to conduct heat from the interior areas of the bundle where "hot spots" are often formed.

It is still another object of the present invention to provide a fiber optic bundle construction and method for cooling a fiber optic bundle through the use of a plurality of conductors disposed within the interstitial spaces of the bundle, and wherein the conductors are coupled to a heat sink which assists the conductors in drawing heat generated at the interior areas of the bundle out of the bundle and dissipating same.

It is still another object of the present invention to provide a fiber optic bundle construction and method therefor which allows the interior areas of a fiber optic bundle to be cooled through the use of a plurality of conductors disposed in the interstitial spaces of the bundle, where the conductors do not significantly complicate the construction of the fiber optic bundle or add significantly to its overall cost.

SUMMARY OF THE INVENTION

The above and other objects are provided by an apparatus and method for cooling a fiber optic bundle by the placement of a plurality of heat pipes within the interstitial spaces of the bundle. In one preferred embodiment, the fiber optic bundle is formed into a hex-packed bundle arrangement. A plurality of heat pipes represented by elongated, thermally conductive strands of material are disposed in the interstitial spaces formed between adjacent pluralities of fiber optic strands of the bundle. One end of each of the thermally conductive strands is preferably coupled to a heat sink.

The thermally conductive strands operate to absorb heat generated within the interior areas of the fiber optic bundle due to the various inefficiencies inherent in the coupling of the light energy received by the bundle. The thermally conductive strands function to effectively channel heat out of the interior areas of the bundle to the heat sink.

The apparatus and method of the present invention therefore does not rely on complex and/or costly mechanisms which attempt to more efficiently couple the light energy from a high intensity light source to the fiber optic bundle. Moreover, the apparatus and method of the present invention does not require the use of fluid to be conducted through the interior area of the fiber optic bundle and the associated complexities and costs associated with such a system.

BRIEF DESCRIPTION OF THE DRAWINGS

The various advantages of the present invention will become apparent to one skilled in the art by reading the following specification and subjoined claims and by referencing the following drawings in which:

FIG. 1 is a simplified, enlarged perspective view of a portion of a hex-packed, fiber optic bundle incorporating a plurality of thermally conductive elements in accordance with a preferred embodiment of the present invention;

FIG. 2 is an enlarged perspective view of an alternative preferred form of thermally conductive strand having a three sided, cross-sectional star shape;

FIG. 3 is an enlarged, perspective view of yet another alternative preferred form of thermally conductive strand having a four sided, cross-sectional star shape;

FIG. 4 is an enlarged, perspective view of yet another alternative preferred form of thermally conductive strand having a hexagonal, cross-sectional shape; and FIG. 5 is a perspective, enlarged view of yet another alternative preferred form of thermally conductive strand having an octagonal, cross-sectional shape.

DETAILED DESCRIPTION OF THE PREFERRED EMBODIMENTS

Referring to FIG. 1, there is shown a fiber optic bundle 10 in accordance with a preferred embodiment of the present invention. The fiber optic bundle 10 includes a sheath 12 which retains a plurality of fiber optic elements or strands 14 in a packed configuration. While a hex-packed configuration is shown in FIG. 1, it will be appreciated immediately that the fiber optic strands 14 could be held in a wide variety of cross-sectional shapes. Thus, the invention is not limited to the hex-packed configuration shown in FIG. 1.

In between adjacent ones of the fiber optic strands are interstitial spaces 16. Disposed within each of the interstitial spaces is a "heat pipe" in the form of a thermally conductive element 18. Each thermally conductive element 18 extends preferably along the entire length of the fiber optic bundle 10 and includes an additional length sufficient to extend out from at least one end of the bundle 10. These ends, denoted by reference numerals 18a, are coupled to a heat sink 20. The thermally conductive strands 18 may be formed from any material having good thermal conductivity. Suitable materials include, but are not limited to, aluminum, copper or gold. The diameter of each thermally conductive element 18 may vary significantly as needed to meet the needs of any particular application. The thermally conductive strands 18 effectively form a thermally conductive framework for supporting the fiber optic strands 14.

In operation, heat will be generated not on an outer surface 10a of the bundle 10, but rather within its interior area. Thus, merely cooling the outer surface 10a of the bundle 10 will have little affect on dissipating the heat generated within the bundle. The conductive elements 18, however, are in intimate physical contact with surfaces of the fiber optic strands 14 throughout the cross-sectional area of the bundle 10 and are therefore able to absorb heat efficiently from each of the fiber optic strands 14.

The heat sink 20 is shown in very simplified form. The heat sink 20 may comprise a section of aluminum, copper or any other form of highly thermally conductive material. Alternatively, the heat sink 20 could incorporate a plurality of cooling fins or possibly be disposed adjacent to a fan which blows cool air onto the heat sink 20. Still further, the heat sink 20 could be formed with a plurality of fluid carrying channels therein to receive a cooling fluid. With each of these embodiments, however, the heat sink 20 operates to assist the thermally conductive elements 18 in drawing heat out from the interior area of the fiber optic bundle 10.

The thermally conductive elements 18 further do not significantly complicate the manufacture of a fiber optic bundle. The conductive elements 18 further do not significantly impede or restrict the flexibility of the fiber optic bundle 10 or add significantly to the cost of manufacturing the fiber optic bundle 10.

Referring to FIGS. 2–5, the thermally conductive element is shown in various alternative preferred forms. In FIG. 2, a heat conductive element 30 is formed with a cross-sectional shape somewhat similar to a three-pointed star having slightly curving wall portions 30a. In FIG. 3, a heat conducting element 32 is shown having a four-pointed star cross-sectional shape with curving wall portions 32a. In FIG. 4, a heat conducting element 34 is illustrated having a hexagonal shape. FIG. 5 shows yet another alternative preferred heat conductive element 36 having an octagonal cross-sectional shape.

FIGS. 2–5 are merely intended to show that other cross-sectional configurations for the thermally conductive elements 18 are possible. It will be appreciated that still further shapes could be employed, but it is expected that the cross-sectional shapes shown in FIGS. 2 and 3 will likely produce the most effective cooling, depending upon the specific arrangement of the fiber optic strands 14, due to the increased area of contact with the fiber optic strands 14.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A fiber optic transmission apparatus adapted to more efficiently dissipate heat generated therein, said apparatus comprising:

a plurality of optical fibers;

a sheath for enclosing said optical fibers closely adjacent one another in a bundle separated by interstitial spaces between said optical fibers;

at least one elongated, thermally conductive element disposed in thermal contact with at least one of said optical fibers and within one of said interstitial spaces, for absorbing heat generated by said optical fiber; and an end of said one elongated, thermally conductive element being coupled to a heat sink for conducting heat from said conductive element, and therefore from said optical fiber with which said conductive element is in thermal contact with.

2. The apparatus of claim 1, further comprising a plurality of said elongated, thermally conductive elements disposed within said interstitial spaces and coupled to said heat sink.

3. The apparatus of claim 1, wherein said elongated, thermally conductive element comprises a cross-sectional shape which operates to substantially fill said interstitial space within which it is disposed.

4. The apparatus of claim 3, wherein said cross-sectional shape of said elongated, thermally conductive element comprises a circular shape.

5. The apparatus of claim 3, wherein said cross-sectional shape of said elongated, thermally conductive element comprises a star shape.

6. The apparatus of claim 3, wherein said cross-sectional shape of said elongated, thermally conductive element comprises a hexagonal shape.

7. The apparatus of claim 3, wherein said cross-sectional shape of said elongated, thermally conductive element comprises an octagonal shape.

8. A fiber optic transmission apparatus adapted to more efficiently dissipate heat generated therein, said apparatus comprising:

a plurality of optical fibers;

a sheath for enclosing said optical fibers closely adjacent one another in a bundle separated by interstitial spaces between said optical fibers;

a plurality of elongated, thermally conductive elements disposed in thermal contact with said optical fibers within said interstitial spaces, for absorbing heat generated by said optical fibers, said plurality of thermally conductive elements substantially filling said interstitial spaces; and an end of each one of said one elongated, thermally conductive elements being coupled to a heat sink for conducting heat from said thermally conductive elements, and therefore from said optical fibers with which said thermally conductive elements are in thermal contact with.

9. The apparatus of claim 8, wherein said elongated, thermally conductive elements each comprise a cross-sectional circular shape.

10. The apparatus of claim 8, wherein said elongated, thermally conductive elements each comprise a cross-sectional star shape.

11. The apparatus of claim 8, wherein said elongated, thermally conductive elements each comprise a cross-sectional hexagonal shape.

12. The apparatus of claim 8, wherein said elongated, thermally conductive elements each comprise a cross-sectional octagonal shape.

13. The apparatus of claim 8, wherein said elongated, thermally conductive elements are interconnected with each other to form a thermally conductive framework for supporting said optical fibers within said sheath.

14. A fiber optic transmission apparatus adapted to more efficiently dissipate heat generated therein, said apparatus comprising:

a plurality of optical fibers;

a sheath for enclosing said optical fibers closely adjacent one another in a hex-shaped bundle, wherein said optical fibers are separated by interstitial spaces;

a plurality of elongated, thermally conductive elements disposed in thermal contact with said optical fibers within said interstitial spaces, for absorbing heat generated by said optical fiber, said plurality of thermally conductive elements substantially filling said interstitial spaces and extending along substantially the entire length of said optical fibers; and an end of each one of said one elongated, thermally conductive elements being coupled to a heat sink for conducting heat from said thermally conductive elements, and therefore from said optical fibers with which said thermally conductive elements are in thermal contact with.

15. The apparatus of claim 14, wherein said elongated, thermally conductive elements each comprise a cross-sectional star shape.

16. The apparatus of claim 14, wherein said elongated, thermally conductive elements each comprise a cross-sectional circular shape.

17. The apparatus of claim 14, wherein said elongated, thermally conductive elements each comprise a hexagonal shape.

18. The apparatus of claim 14, wherein said elongated, thermally conductive elements each comprise an octagonal shape.

19. The apparatus of claim 14, wherein said elongated, thermally conductive elements are coupled together to form a support framework comprising a plurality of parallel channels, said channels being operable to receive said optical fibers so as to be supported by and in thermal contact with said support framework.

20. A method of cooling a fiber optic bundle comprising the steps of:

providing a plurality of fiber optic strands;

packing the fiber optic strands closely adjacent one another within a sheath to form a fiber optic bundle, the placement of the fiber optic strands creating a plurality of interstitial spaces between adjacent ones of the fiber optic strands; and disposing a plurality of elongated, thermally conductive elements in the interstitial spaces between adjacent ones of the fiber optic strands such that the thermally conductive elements are in thermal contact with the fiber optic strands, to thereby conduct heat generated in the fiber optic strands from the strands.

21. The method of claim 14, further comprising the step of:

forming each of the elongated, thermally conductive elements with a length sufficient to extend out from one end of the fiber optic bundle; and coupling an exposed end of each of the thermally conductive elements to a heat sink.

* * * * *